United States Patent [19]

Rogers et al.

[11] 4,420,689

[45] Dec. 13, 1983

[54] MULTI-ANODE DEEP WELL RADIATION DETECTOR

[75] Inventors: Arthur H. Rogers, Los Altos, Calif.; Kevin J. Sullivan, Medfield, Mass.; Gerald R. Mansfield, Painted Post, N.Y.

[73] Assignee: Medical and Scientific Designs Inc., Rockland, Mass.

[21] Appl. No.: 333,629

[22] Filed: Dec. 22, 1981

[51] Int. Cl.$^3$ .......... G01T 1/18

[52] U.S. Cl. .......... 250/385; 250/328

[58] Field of Search .......... 250/328, 358.1, 359.1, 250/374, 385, 394; 313/93

[56] References Cited

U.S. PATENT DOCUMENTS

| | | | |
|---|---|---|---|
| 2,812,464 | 11/1957 | Pepinsky | 313/93 |
| 2,957,084 | 10/1960 | Marr et al. | 250/385 |
| 3,359,421 | 12/1967 | Perez-Mendez et al. | 250/385 |
| 3,359,443 | 12/1967 | Givens | 250/385 |
| 3,710,166 | 1/1973 | Perelman et al. | 250/374 |
| 3,923,463 | 12/1975 | Bagshawe et al. | 250/328 |
| 4,031,396 | 6/1977 | Whetten et al. | 250/385 |
| 4,035,642 | 7/1977 | Johnson, Jr. et al. | 250/328 |
| 4,047,039 | 9/1977 | Houston | 250/385 |
| 4,047,040 | 9/1977 | Houston | 250/385 |
| 4,131,798 | 12/1978 | Reddy et al. | 250/328 |

*Primary Examiner*—Janice A. Howell
*Attorney, Agent, or Firm*—Paul Hentzel

[57] ABSTRACT

An inner and outer cylindrical cathode are concentrically positioned about a vertical center axis. Vertical anode electrodes extend parallel to the center axis and are symmetrically arranged around the inter-cylinder space between the cathodes. The ends of the anode wires are supported by a pair of insulator rings mounted near the top and bottom of the cathode cylinders. A collection voltage applied to each anode wire for establishing an inward radial E field to the inner cathode cylinder and an outward radial E field to the outer cathode cylinder. The anode-cathode assembly is mounted within a housing containing a conversion gas. A radioactive sample is inserted into the inner cathode which functions as a tubular, deep well radiation window between the sample environment and the conversion gas environment. A portion of the gamma radiations passing through the inter-cylinder region interact with the conversion gas to produce free electrons which are accelerated by the E fields and collected on the anode wires. The extremely small diameter of the anode wires intensifies the electric fields proximate each wire causing avalanche multiplication of the free electrons resulting in a detectable charge pulse.

37 Claims, 13 Drawing Figures

MULTI-ANODE DEEP WELL RADIATION DETECTOR

TECHNICAL FIELD

This invention relates to gamma radiation detectors, and more particularly to multi-anode field configurations of proportional wire detectors.

BACKGROUND

Heretofore, large NaI:Tl crystals have been used in scintillation counters to convert deep well gamma radiation into photons which were amplified by peripheral photo-multiplier tubes. The gamma-to-charge conversion is a complex, multi-step process involving:

1. an encounter with an iodide atom,
2. release of an outer shell electron,
3. excitation of NaI by the free electron,
4. migration of the excitation energy to a Tl dopant center,
5. emission of a photon within the spectral range of a photo-multiplier phosphor, and
6. cascade multiplication within the stages of a photo-multiplier tube.

While these sophisticated counters are highly useful in research; their size, complexity, cost, and short life time have limited their commercial applications.

The extended dimensions required to combine the NaI crystal with a discrete photo-multiplier tube, reduces realizable cell density. In addition, the NaI crystals required a hermetic perpheral seal. Water traces cause the crystal to lose its scintillation properties. Small infiltration rates can result in water accumulation within the crystal, which degrades the crystal structure. The absolute "dry room" conditions essential for the proper crystal growing, machining, and packaging, contribute to the already high cost of the scintillation units.

Single wire Geiger counter chambers offer a direct conversion of gamma radiations to electrons. However, the high collection voltage between the center wire anode and the outer cylinder cathode causes complete, selfsustaining electrical breakdown in response to any radiation above the detection threshold. The vigorous avalanche proximate the centr anode spreads spontaneously along the wire, and must be extinguished after each count by temporarily reducing the collection voltage. This de-ionization relaxation period after each detection is "dead time" and severely limits the upper count rate of Geiger counters.

For the conventional wide angle applications, the peripheral cylindrical housing forms the radiation window. The window must be thin to permit penetration by gamma radiation; and therefore cannot withstand the internal expansion force of a pressurized conversion gas. Most Geiger counters are limited to near atmospheric internal pressures and hence have low gamma conversion ratios.

The total ionization associated with each detection cycle generates molecular degradation within the conversion gas; which in combination with the tremendous acceleration proximate the center anode wire, causes slow structural degradation of the anode surface. Geiger counters typically have shorter useful lifetimes than proportional counters which operate at lower voltages with less ionization.

SUMMARY

It is therefore an object of this invention to provide an improved less expensive radiation detector.

It is another object of this invention to provide a radiation detector with an efficient, direct radiation-to-signal conversion.

It is another object of this invention to provide a radiation detector with minimum contamination effects and prolonged service life.

It is another object of this invention to provide a radiation detector which may be periodically rejuvinated.

It is a further object of this invention to provide a proportional counter with a lower power supply drain current.

It is a further object of this invention to provide a proportional counter having a higher ratio of conversion gas volume per volt of collection voltage.

It is a further object of this invention to provide a deep well proportional counter with lower count variation in response to the disposition of the radiation source within the well.

It is a further object of this invention to provide a proportional counter array with a high packing density.

It is a further object of this invention to provide an array of proportional counters which are less sensitive to operating fluctuations in collective voltage.

Briefly, these and other objects of the present invention are accomplished by providing a plurality of spaced anode wires with a cathode means spaced from the anode wires defining a collection region therebetween through which the gamma radiations propagate. A conversion medium within the collection region converts the energy of a portion of the gamma radiation into transient charged particles of the conversion medium. A power supply maintains an electric field across the collection region from the anode wires to the cathode for accelerating the negative transient particles towards the anode wires causing avalanche multiplication and collection of the negative particles onto the anode wires for producing an output charge proportional to the energy of the converted gamma radiation.

BRIEF DESCRIPTION OF THE DRAWINGS

Further objects and advantages of the present radiation detector and the operation of the anode wires will become apparent from the following detailed description and drawing in which.

SINGLE CELL EMBODIMENT

General Operation

Figure 1A:
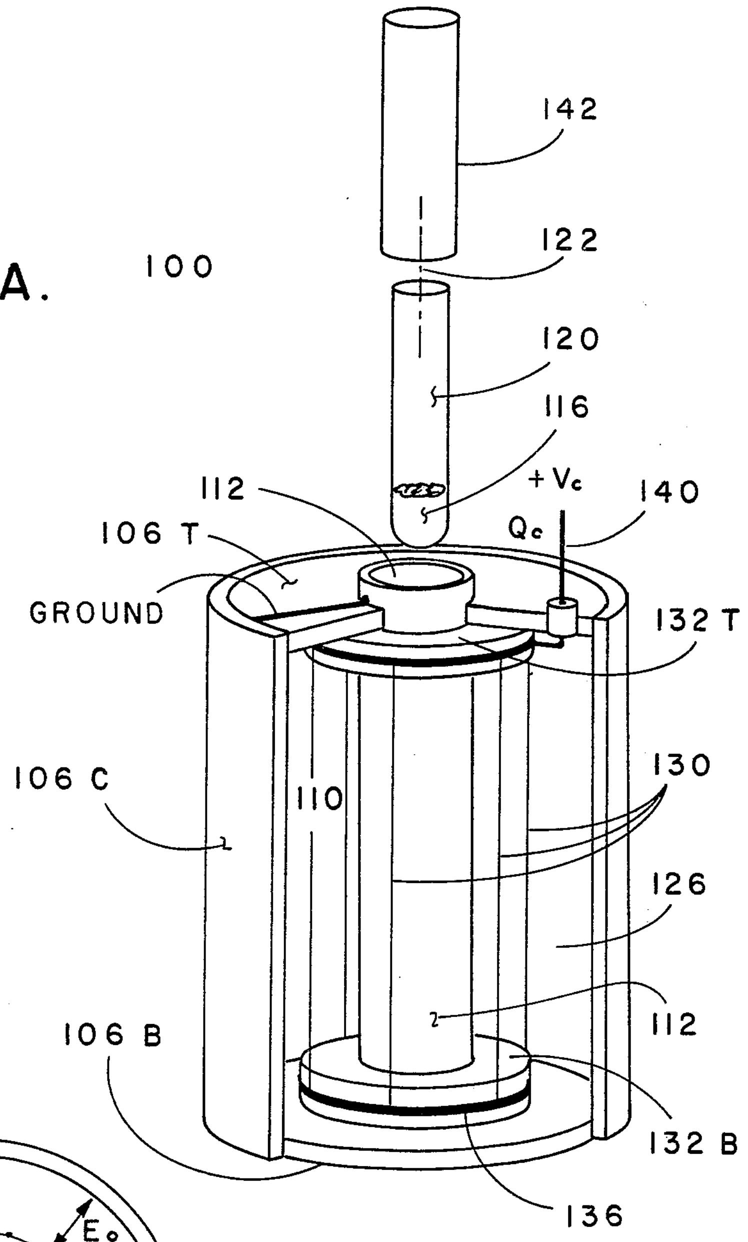
FIG. 1A is an isometric view of a single cell embodiment cut away to show the interior cell assembly.

FIG. 1A shows a radiation detector 100 having a single detection cell assembly 110 within housing 106, containing a radiation-to-electron conversion gas having an ionizing portion (such as Xenon) and an additive portion (such as methane). Housing 106 defines the gas conversion region of cell 100. The conversion gas is preferably under several atmospheres of pressure, requiring a suitable hermetic retaining envelope such as formed by end plates 106T and 106B welded to cylinder 106C. An assay region formed by deep well 112 along the central axis of cylinder 106C, receives radioactive source 116 for detection. Source 116 is packaged in a suitable container such as a plastic or thin walled glass tube 120. Source container 120 is inserted into well 112 along insertion axis 122 to a middle depth where source 116 is laterally surrounded by the gas conversion region. Container 120 remains in th room environment, physically isolated from the gas environment within housing 106 by the barrier effect of the well material. In the embodiment shown, well 112 is open at the top and bottom for receiving container 120 at either end. Alternatively, container 120 may be passed through well 112; or the well may not extend all the way through the conversion region.

Gamma radiation emmanate isotropically from source 116, and pass through the thin side wall of container 120 and into the conversion region through a low "Z" radiation window formed by the thin walls of center well 112. The probability of conversion for radiations passing through the conversion gas is a function of the path length of the radiation through the gas and the density of the gas. Each converted radiation quantum generates a free electron of about 30 Kev which loses its energy over a collision course of several millimeters releasing several hundred transient secondary electrons.

Figure 1B:
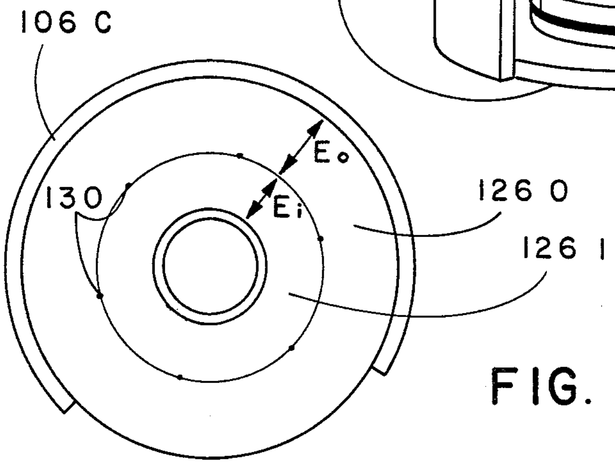
FIG. 1B is a top view of the cell assembly showing inner and outer electron collection regions.

An electron collection and amplification region 126 is formed within housing 106 encompassing the assay region, by an inner cathode (the outer surface of central tube 112) and an outer cathode (the inner surface of cylinder 106C). Anode 130 is formed by a set of spaced vertical anode wires arranged in a cage like structure between the cathodes. The upper and lower ends of each anode wire is supported by top and bottom insulating supports 132T and 132B. A positive collective voltage Vc is applied to anode wires 130 through a conduction band or collar 136 around at least one of the end supports 132. Vc establishes an outer electric field Eo (see FIG. 1B) across an outer collection region 126:O extending from anode wires 130 radially outward to outer cathode 106C, and an inner field Ei across an inner collection region 126:I extending radially inward to inner cathode 112. The collection fields Eo and Ei accelerate the secondary electrons within the two collection regions towards the nearest anode wire 130. The anode wires have an extremely small diameter causing an immense concentration of the E field proximate each wire. The resulting avalance multiplication produces thousands of avalanche electrons for each secondary electron. All of the collected electrons combine to form a pulse of output charge Qc on output lead 140. The collected charge is transferred to an event indicator (not shown).

The output charge yield per applied collection volt is improved by collecting the secondary transient charge released after each gamma conversion simultaneously from both outer and inner collection regions 126. The two cathode configuration doubles the radiation pathlength through the conversion gas causing a two fold increase in the probability of conversion. This improvement in collection efficiency is effected without increasing the collection voltage. Further, the central location of the assay region reduces the volume (and corresponding gas cost) of inner collection region 126:I while supporting the same pathlength as outer collection region 126:O.

Lower energy gamma radiations are unable to penetrate the side wall material of glass tube 120 and center well 112. These low energy gammas are absorbed in the side wall material and therefore do not generate a transient output charge. The absorption threshold may be increased to eliminate medium energy gammas by inserting low energy filter sleeve 142 into center well 112. Filter 142 provides additional side wall material for absorption. Adjacent energy peaks may be separated by eliminating the lower peak through proper selection of the mass and thickness of filter 142.

Proportional Operation Mode

Figure 2A:
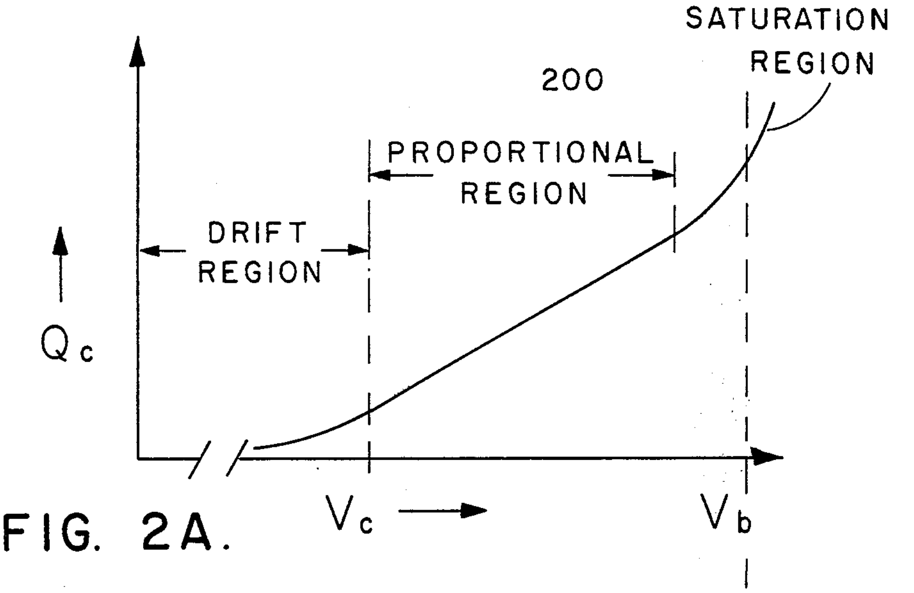
FIG. 2A is a typical curve of collected charge (Qc) for a fixed number of primary electrons verses collection voltage (Vc) showing the proportional operation region of the type of cell of FIG. 1.

The value of the collection voltage Vc on anode wires 130 is selected to establish cell operation in the proportional region of the Qc-Vc operation curve 200 (see FIG. 2A). The proportional region is between the lower Vc drift region (no avalanche) and the higher Vc (Geiger) saturation region. In the proportional region, the charge Qc of collected electrons is directly proportional to the number of secondary electrons generated, and somewhat less proportional to the energy of the converted gamma radiation. The actual collection level along the proportional region is a function of the applied Vc, which permits the use of upper and lower thresholds to limit the counting sensitivity to a given range of gamma energies. Geiger counters, in contrast, operate in the a non-discriminatory saturation mode with a breakdown voltage Vb applied across the chamber.

The proportional Vc is lower than the Vb required by Geiger counters. This lower voltage enhances the reliability and service life of radiation detector 100. The proportional voltages subject the conversion gas additive to less "stress deterioration", an aging effect characterized by molecular breakdown. In addition the lower level of ionization produces less surface pitting and embrittlement of the anode material which enhances anode performance and lifetime.

Vc Insensitive Plateau

Figure 2B:
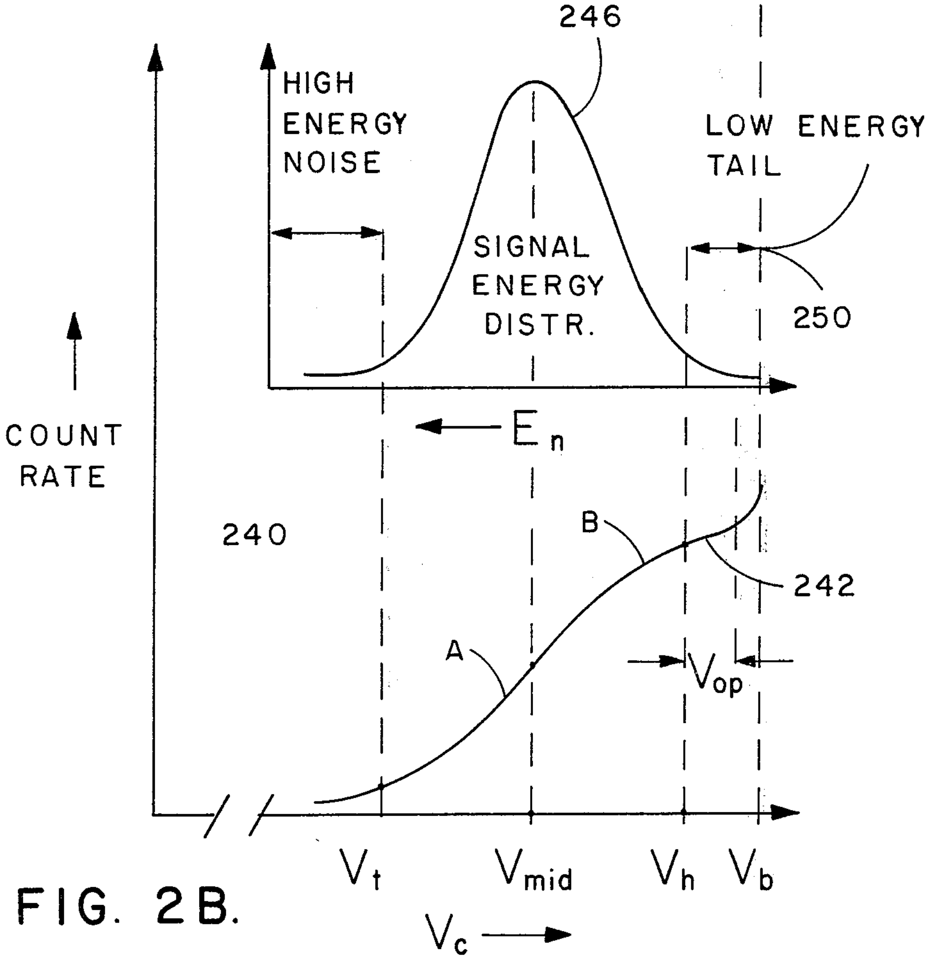
FIG. 2B is a curve of count rate verses Vc showing a voltage insensitive plateau within a Vc operating range.

The radiation count rate from cell 100 increases as Vc is increased from a low threshold voltage Vt to a high total collection voltage Vh (see Count Rate verses Vc curve 240, FIG. 2B). Further increases in Vc above Vh have little affect on the count rate until Vc approaches the breakdown voltage Vb. The nearly horizontal count rate plateau 242 between Vh and Vb offers a Vc insensitive operation range Vop. The count level at plateau 242 is the integral of the "Total Count Rate" within energy peak 246 (superimposed above curve 240).

At pre-threshold collection voltages (Vc<Vt), cell 100 is unable to detect even the highest radiations within energy peak 246 because the released electrons are not accelerated sufficiently by the low E field. Some of these slow electrons recombine prior to reaching the avalanche zone around each anode. Others fail to avalanche fully, generating smaller charge pulses which are lost in the electronic noise in the pre-threshold voltage region. At collection voltage Vc=Vt only the highest energy radiations of peak 246 are detected, accounting for the start of positive transition A in curve 240. The faster primary electrons resulting from these higher energy radiations release more secondary electrons which are accelerated sufficiently to avalance, producing a detectable output pulse. At Vc=Vmid, the E field is strong enough to cause a detectable avalanche in response to higher energy half of peak 240. The resulting count level is one half of maximum. At Vc=Vh, virtually the total count of the radiations within energy peak 246 are counted. Further increase in Vc beyond Vh result in only slight increases in count level. Count plateau 242 is not perfectly horizontal due to low energy tail 250 present in energy curve 240 and background cosmic rays.

The count level at plateau 242 is relatively insensitive to Vc drift over collection voltage range Vop. Collection voltage drift may be minimized, but is difficult to eliminate completely. Voltage drift is primarily due to thermal transients in the power supply components and ageing. The operating voltage may be selected near the middle of the collection voltage range Vop for an individual detector (or a group of separate detectors) to obtain improved operation stability, notwithstanding the inevitable voltage drift.

Uniform Collection Field

Each anode wire 130 of cell 100 has an individual Count Rate-Vc curve similar to curve 240. These individual anode curves will be identical if the anode voltage and collection fields around each anode are identical. If the collection fields are slightly different, then each anode exhibits a slightly different Vt, Vh, plateau region 242, and Vb. The overall count rate curve for the cell would then be a blend formed by all of the individual anode curves, with a less pronounced plateau of limited use. Unequal collection fields around the anodes contribute toward "hot spots", variations in the breakdown voltage Vb, resulting in degradation of the width and flatness of plateau 242.

The most direct approach to obtaining identical collection fields about each anode wire 130, is to employ geometric symmetry between anodes in the design of the collection region. In the FIG. 1 embodiment, cylindrical inner cathode 112 and cylindrical outer cathode 106C are concentrically alined with the anode wires symmetrically positioned therebetween. Further, the wires are equally spaced from one another and positioned at the midpoint between the cathode. The geometric midpoint, exactly halfway between the cathodes, may be employed. However, due to a slight field gradient caused by field concentration near the smaller cathode 112; an electric midpoint exists which is slightly closer to inner cathode 112 than the geometric midpoint. At the electric midpoint, Ei is in closer balance with Eo. Use of the electric midpoint has an additional advantage over other anode positions. Minute, unavoidable vibrations along each anode wire are capactively coupled to the cathodes; and cause acoustical noise in the collection current. At the electric midpoint, the counter-acting changes in capacitance between anode 130 and each cathode 112 and 106C cause opposite polarity acoustical signals. Interference between these signals eliminates the acoustical noise effect.

The longitudinal tension on the anodes must be sufficient to prevent the anode wires from "barrelling" outward during operation due to mutual repulsion caused by Vc. If the middle portion of each anode wire is closer to outer cathode 106C than the end portions, Vt, Vh, and Vb become voltage bands instead of more definite and useful precise voltages; causing plateau 242 becomes less pronounced.

SOURCE POSITION DEVIATION

The position of source container 120 within inner cathode 112 may deviate between sources (or within a single sample count period). Further, the position of source 116 within container 120 may vary. The cylindrical, deep well configuration permits substantial variation in source and container position without objectional variations in the count level.

Longitudinal Position Insensitivity

Figure 3A:
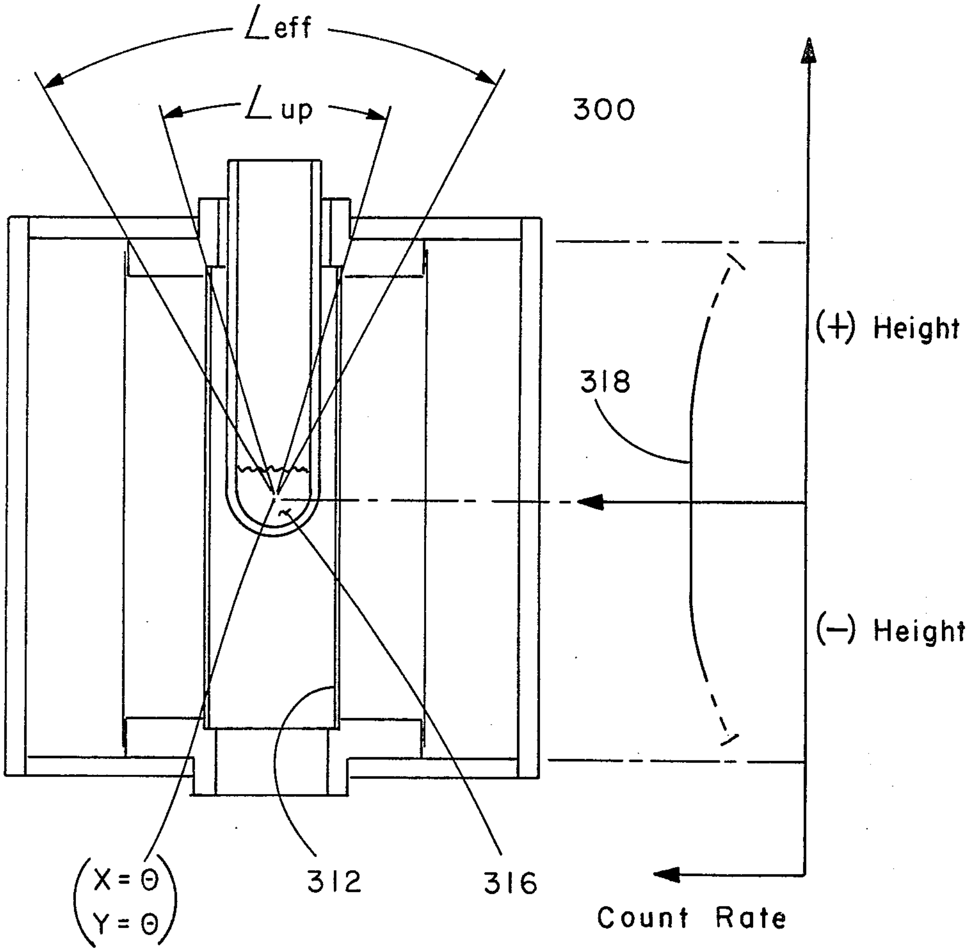
FIG. 3A is a side view in section of an interior cell assembly showing a count insensitive region for longitudinal positions along the mid-depth portion of the well.

FIG. 3A shows detector 300 with the mass center of liquid source 316 positioned at the geometric center of deep well 312. An X-Y coordinate system has been superimposed over detector 300 with the origin coinciding with the center position of source 316. A curve 318 of Source Height against Count Level for deep well detector 312 is adjacently presented for position comparison. The middle portion of curve 318, corresponds to source positions near the origin, and is flat (height insensitive). The count level drops off as the source position approaches the top and bottom ends of well 312.

For central positions, most of the radiations pass through the collection region and contribute to the counting level. The radiations with vertical and near vertical paths escape through the small solid angle formed at both ends of tube 312. For the source position X=0, Y=0, as shown in FIG. 3A, the small upward solid angle of radiation escape A:up is equal to the small downward solid angle A:dn. The remainder of the solid angle around the origin (X=0, Y=0) is the angle of electron collection. Near vertical radiations which strike supports 132T or 132B, either pass through the insulative material or are absorbed therein under non-avalanche conditions. The escape angle may be viewed as an effective escape angle A:eff somewhat greater than A:up, if marginal escape paths through the inside corner of the collection region are considered. These radiations experience a minimal gas path length, and a correspondingly minimal probability of detection.

Source positions just above and below the center position (X=0, Y=0) also have small escape angles;

and therefore a large collection angle. At source positions more distant from the center position, upward escape angle A:up increases slightly permitting more radiation to avoid the collection region; and downward escape angle A:dn decreases slightly permitting fewer radiations to escape. The sum of the escape angles remains almost a constant (A:up+A:dn=C) along the middle portion of well 312. The progressive increases of one escape angle, when combined with the progressive compensating decreases of the opposed escape create the flat middle region of response curve 318. Container and sample positions therein may vary considerable in height without affecting the count level.

Radial Position Insensitivity

Figure 3B:
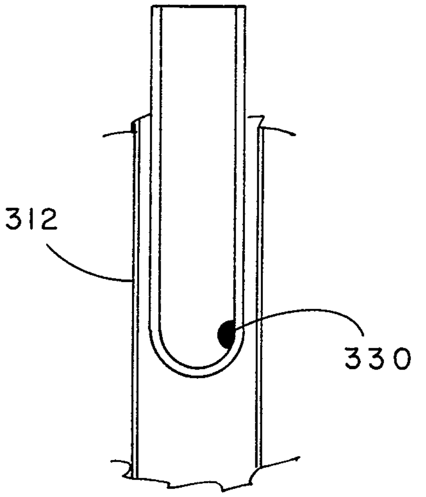
FIG. 3B is a fragmentary side view of a well showing a radioactive substance non-centered within a source container.

FIG. 3B shows the radial displacement of solid source 330 off the Y axis center line of tube 312. The off-center escape angles are off slightly in orientation; but have not changed in value. The sum of the upper and lower escape angles for radially displaced source positions remains constant.

COMPENSATING PATH LENGTHS

The wide conversion angle provided by the deep well offers many possible path orientations for radiation passing through the collection region. Source geometry with longer gas paths have a higher probability of collision and a correspondingly higher detection efficiency. However a "compensating path length" effect tends to even out this apparent non-uniformity.

Figure 4A:
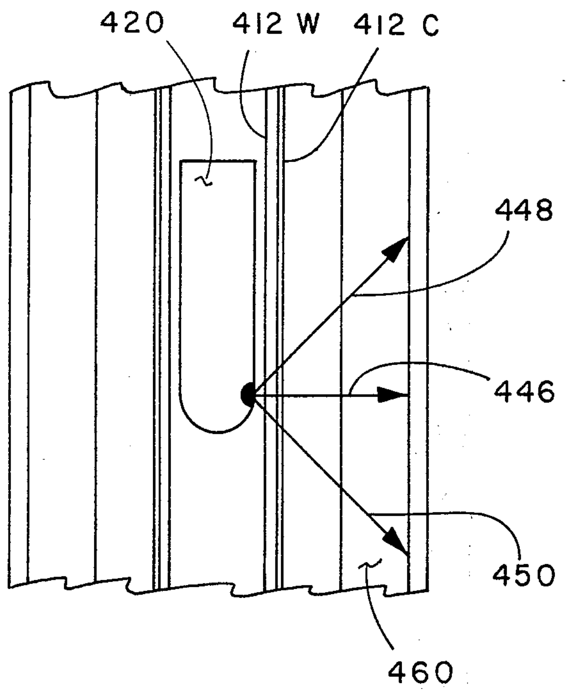
FIG. 4A is a fragmentary side view of a well showing compensating pathlength effects of radiation paths having different pitch orientations.
Figure 4B:
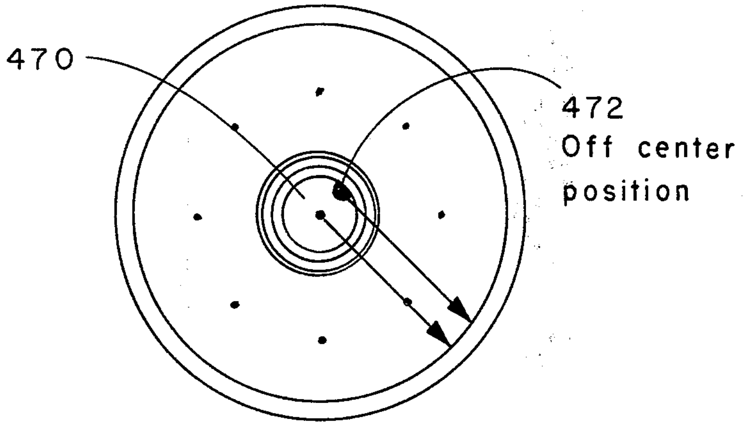
FIG. 4B is a fragmentary top view of a well showing compensating pathlength effects of centered and non-centered radiation sources.

Horizontal path 446 have the shortest gas path (see FIG. 4); but these paths also experience the least absorbtion in the side walls of the source container and the radiation window. Upward paths 448 and downward paths 450 must travel a greater distance in the side walls, and experience a correspondingly greater intensity attenuation prior to detection in collection region 460. However, these inclined paths also have a longer path length through the conversion gas and a correspondingly greater probability of a conversion collision. The attenuation portion of each path is compensated by the conversion portion, reducing variations in the overall detection efficiency for the various paths. This compensation effect is particularly significant in the case of a small diameter sample container which is inserted into the well at an angle and remains cocked against the inner wall of the well during the detection period.

Central source positions 470 (see FIG. 4B) have a shorter attenuation path length then off-center positions 472. Central position 470 also has the shortest conversion path through the conversion gas. Off-center positions 472 have more losses through the side walls; but a correspondingly greater conversion path length.

Array of Detection Cells

Figure 5:
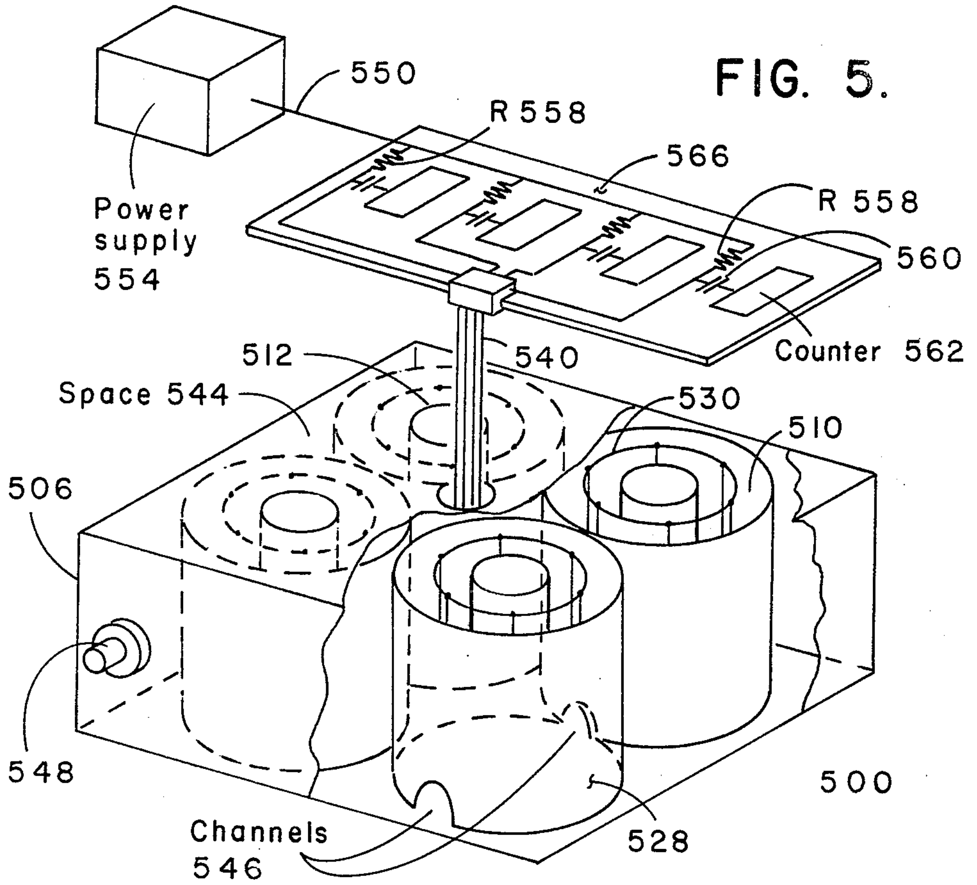
FIG. 5 is a broken away isometric view of a radiation detection system having an array of cells.

Multiple cell planar detector array 500 (shown in FIG. 5) may be employed to simultaneously count radiations from a batch of samples. In the batch or start-stop operation, each cell 510 is loaded with a sample, and the entire array is operated for the count period. If desired, one or more cells may function for system calibration. Such calibration cells may be loaded with a radioactive source having a known count rate.

Each cell may be vented to adjacent cells and interstitial spaces 544 therebetween by channels 546 in outer cathode cylinders 506 to form a common conversion gas environment in fluid communication with each cell and space. The operation of each cell 510 is thus uniformly affected by gas contamination and aging effects. All of the gas related parameters of counting efficiency may be normalized by the calibration count from the calibration sample. Intersticial spaces 544 contain a conversion gas reserve which dilutes the effect of these parameters, and extends the useful life of the gas. Valve port 548 in housing 506 permits the initial installation and periodic replacement or "purging" of the conversion gas.

Cells 510 receive a common Vc through voltage bus 550. Because of the identical geometry, the cells have a common plateau region 242 and may be operated at the same collection voltage from a single power supply 554. A large isolation resistor 558 is connected between bus 550 and each cell access lead 540 to limit the supply current and minimize cross-talk between cells. A d.c. isolation capacitor 560 is connected in series between each access lead and a pulse counter 562 to provide a low impedance output path for the charge pulse collected by anodes 530.

The array interface circuitry (bus 550, resistors 558, capacitors 560, and counters 562) are preferably mounted outside housing 506 on a suitable structure such as interface circuit board 566. Access leads 540 may be grouped together at access port 570 for passage through housing 506. A suitable conductor-to-metal seal such as epoxy or welding may be employed to secure access port 570, preventing the outpassage of the conversion gas and the inpassage of contaminates. Outer cathodes 528 and inner cathodes 512 may be maintained at ground potential, eliminating the necessity of a cathode return lead through access port 570.

The energy for providing the charge in each input pulse is from the gamma conversion within the interior of cells 510. Power supply 554 returns the charge from the anode wire to the cathode. The energy of each detected gamma is converted into a transient charge which is collected and transferred across output capacitor 560 to counters 562. Power supply 554 sustains the electric collection field for acceleration and avalanche. The drain on power supply 554 is a very small leakage current (a few nanoamps) lost to ground from high voltage bus 550, leads 540 and anode wires 530; and an even smaller return current for the collected charge. Power supply 554 may be an inexpensive small capacity device. A limited drift in Vc from supply 554 may be tolerated due to the common plateau region 242.

Figure 6:
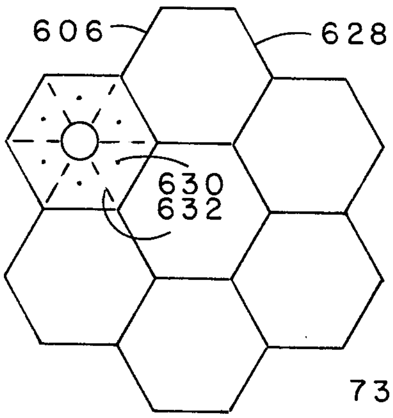
FIG. 6 is a top view of a "honeycomb" cathode array of cathodes formed by six sided regular polygons.

The honeycomb cell structure shown in FIG. 6 eliminates the intersticial spaces to maximize cell packing density and minimize gas volume and cost requirements. Outer cathode 606 is formed by a regular polyhedron shell having N sides, where N=6. Each side of each interior polygon cell is contiguous with one side of N neighbor cells. The peripheral cells are not surrounded by neighbors and therefore have exterior sides which are not shared. Anode wires 630 are preferably mounted in geometrically identical positions within each polygon cell, and axially symmetrical with the polygon shell. These identical anode positions may be visualized by dividing shell 606 into N imaginary triangular prism volumes shown in FIG. 6 (dashed lines 632). Each prism volume has one polygon side as a base and two leg sides extending from the vertex edges of the base to the axis of shell 606. In the FIG. 6 embodiment, a single anode wire is positioned along the center line of each prism volume. Each anode is in a plane which is orthogonal to and bisects the base, and passes through the center of the shell.

Figure 8:
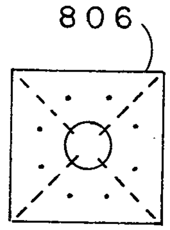
FIG. 8 is a top view of a square cathode with more than one anode in each prism volume.
Figure 7:
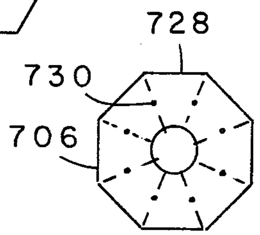
FIG. 7 is a top view of an eight sided cathode divided into triangular prism volumes for aiding the positioning of the anode wires.

FIG. 7 shows a regular polygon cell 706 where N=8, and the anode wires 730 are positioned within the leg plane of each prism volume. FIG. 8 shows a four sided regular polygon 806 with two anodes 830 positioned in each triangular prism volume with geometric and axial symmetry.

Figure 9:
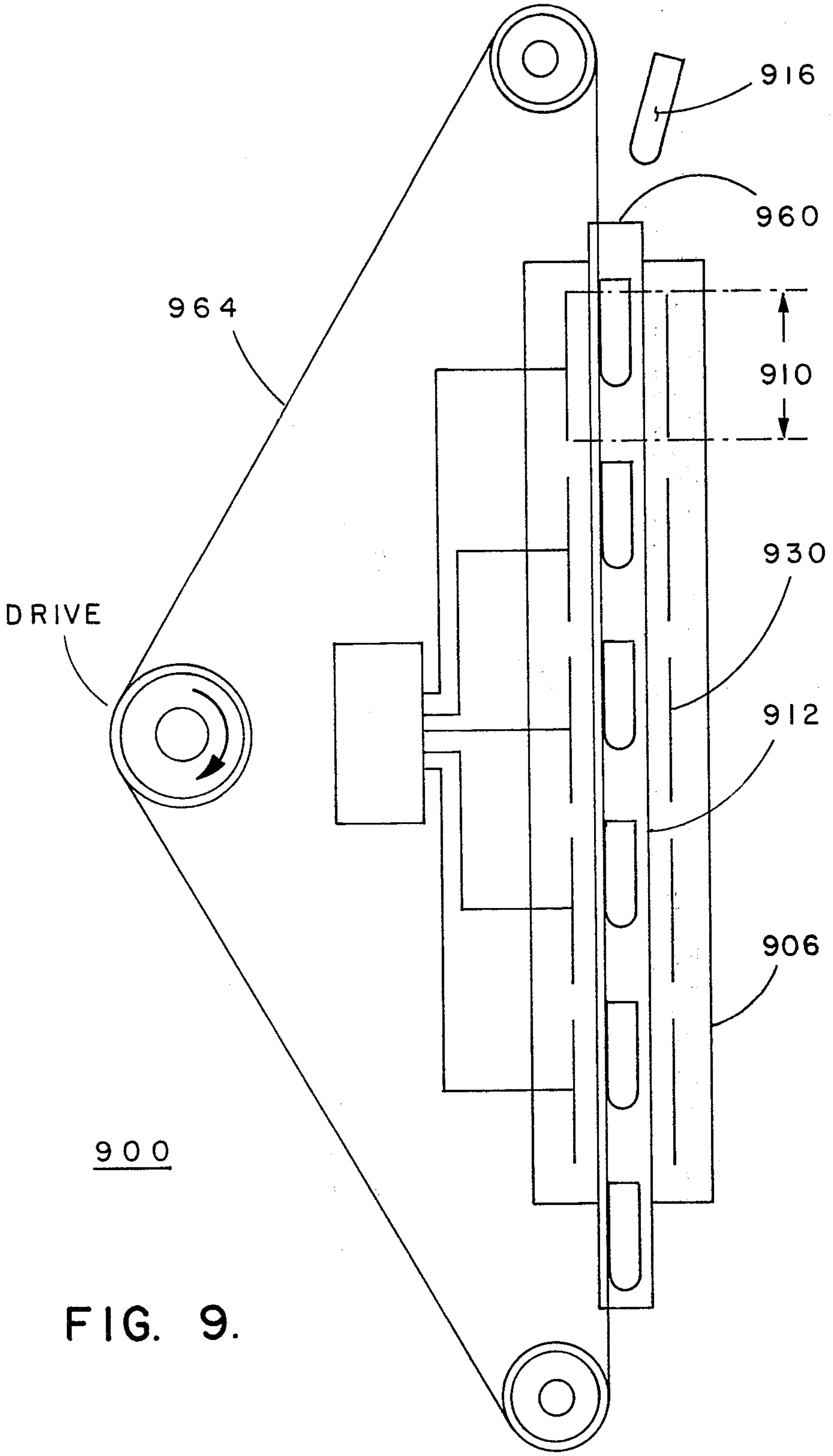
FIG. 9 is a sectional view of a detection system having a sequential series of counting stations with a radiation source conveyor.

Multiple cell serial detector array 900 (shown in FIG. 9) may be employed to continuously count radiations from a series of samples sequentially introduced at input 960. Endless conveyer belt 964 moves each sample 916 past each detection station or cell 910. The center well of each cell is open at both ends to permit belt 964 and sample 916 to pass therethrough. Inner cathode 912 may be an elongated cylinder forming a common cathode at a common voltage for each cell 910. Outer cathode 906 may also be an elonged cylinder forming a common outer cathode at a common voltage (preferably ground) for each cell. Each set of anode wires 930 are isolated to minimize cross talk. Belt 964 could be a non-reusable strip of absorbent material such as filter paper which is unwound from a supply roll and taken up on a waste roll. The paper strip receives several drops of each radioactive sample at equal spaced intervals in registration with the spacing between serial cells 910. Alternatively, the samples could be gravity fed down an inclined inner chute. As each sample was removed from the bottom of the chute, all the remaining samples slide down to the next counting station.

SPECIFIC EMBODIMENT

The following particulars are given as an illustrative example of a single cell detector. The dimensions and values given below are not intended as defining limitations of the invention. Numerous other embodiments and configurations are possible. In this example:

Inner cathode: Aluminum tube 0.020" thick, length 3 to 4 inches, diameter $\frac{5}{8}$ to $\frac{3}{4}$ OD.

Outer cathode: aluminum body, length 3 to 4 inches, diameter 1.5 inches.

Anode wires: eight, symmetrically spaced, 20 micron, gold plated tungsten, length about 4/5 of outer cathode, tension about 60 grams. barrelling displacement estimated at less then 40 microns.

Conversion gas:mixture of 95 percent Xenon with 5 percent methane quenching additive at 5–8 atmospheres.

Voltages: V:op=4.3K (+or−200), Vt=3.5K, Vh=4.1K.

Gammma source: I:125 36 Kev peak at 1K-50K cpm.

Count Period: 2–3 minutes.

Resistors: 10 Meg ohms.

Capacitors microfarad range.

The dimensions and values given above may vary considerable depending on the application involved. The inner cathode may be less than 0.020" to accommodate lower energy gammas. The gas pressure may be reduced to avoid compressive rupture of this thinner inner cathode. Cells longer than 4" or shorter than 3" may be provided with corresponding enhancement and degradation of the longitudinal count insensitive region shown in FIG. 3. Longer and larger diameter cells have a somewhat higher gamma conversion efficiency, with a corresponding increase in gas requirement. More anodes may be employed to reduce the low E field dead volume between adjacent wires. Larger diameter wires will exhibit less barrelling; but also reduce the adjacent field intensity causing less avalanche gain.

CONCLUSION

Clearly various changes may be made in the structure and embodiments shown herein without departing from the concept of the invention. For example, the inner cathode may be formed by a film 412C of a suitable conductive material such as aluminum, deposited on the outside surface of a cylinder of a suitable strong, low Z material such as a ceramic. The low absorbtion properties of the well material permit lower energy gammas to penetrate into the conversion region for detection. Further, a cathode output of positive charge may be provided at either, or both, cathodes. The outer cathode may be a mesh conductive material to provide fluid communication between cells via the intersticial spaces. Further, the features of the embodiments shown in the various Figures may be employed with the embodiments of the other Figures.

Therefore, the scope of the invention is to be determined by the terminology of the following claims and the legal equivalents thereof.

I claim as my invention:

1. An apparatus for assaying a radioactive sample within an assay region for individual gamma radiations emitted therefrom, by providing an output charge in response to each detected gamma radiation propagating from the radioactive source in the assay region, comprising:

a plurality of spaced fine anode wires;

area cathode means encompassing the assay region containing the radioactive sample, and spaced from the anode wires defining a collection region between the cathode means and the anode wires through which the gamma radiations propagate;

conversion medium within the collection region for individually converting the energy of at least a portion of the gamma radiations into transient charged particles;

power source for maintaining an electric field across the collection region from the anode wires to the area cathode means, which electric field accelerates the transient positive charge towards the area cathode, and accelerates the transient negative particles towards the anode wires causing avalanche multiplication and collection of the negative particles onto the anode wires for defining the output charge; and a barrier means between the assay region and the collection region for physically isolating the conversion medium from the radioactive sample.

2. The gamma detector of claim 1, wherein the barrier means forms an envelope around the conversion medium and the collection region.

3. The gamma detector of claim 2, wherein the output charge is a transient positive charge collected at the area cathode means.

4. The gamma detector of claim 2, wherein the output charge is a transient negative charge collected at the anode wires.

5. The gamma detector of claim 2, wherein the conversion medium within the envelope is a high mass gas under pressure for supporting the conversion of the gamma radiation into charged particles.

6. The gamma detector of claim 1, wherein the anode wires are positioned axially symmetrically around the assay region.

7. A radiation detector for providing an output charge pulse in response to transient charged particles generated by individual gamma radiations from a radioactive source by means of a radiation-to-electron conversion medium and high voltage collection, comprising:

envelope means for containing the conversion medium for defining a radiation-to-electron conversion region;

cathode means within the envelope means defining a charge collection region within the conversion region;

an elongated well formed in the envelope means and extending into the interior of the charge collection region for defining and encompassing an assay region external to the envelope means, the well having at least one open end adapted to receive the radioactive source;

a thin uniform radiation window forming a major portion of the walls of the well to permit uniform passage of radiations from the encompassed assay region into the conversion region;

a set of spaced anode wires within the envelope means extending within the charge collection region along the elongated well, and positioned around the well;

an insulative end support positioned within the conversion region at each end of the set of anode wires for collectively supporting the anode wires;

anode bus means positioned within the conversion region and connecting each of the anode wires;

a single bus port in the envelope means for passing the anode bus means through the envelope means; and conductive means in electrical contact with the cathode means and the anode bus means and adapted to receive a high collection voltage for establishing a charge collection electric field from the anode wires to the cathode means for collecting the transient charged particles to provide the output charge pulse.

8. The radiation detector of claim 7, wherein the well is an elongated cylindrical tube open at both ends.

9. The radiation detector of claim 7, wherein the cathode means is formed by an outer cathode electrode and an inner cathode electrode with the set of anode wires positioned therebetween for supporting an outer collection electric field and an inner collection electric field.

10. The radiation detector of claim 9, wherein the cathode electrodes are concentric cylinders.

11. The radiation detector of claim 10, wherein the well is a conductive cylinder and forms the inner cathode electrode.

12. The radiation detector of claim 10, wherein the well is a cylinder with a conductive outer surface interfacing with the conversion region forming the inner cathode electrode.

13. The radiation detector of claim 10, wherein the anode wires are symmetrically positioned between the two cathode electrodes.

14. The radiation detector of claim 13, wherein each anode wire is positioned at the geometric center between the cathode electrodes.

15. The radiation detector of claim 13, wherein each anode wire is positioned at the electrical center between the cathode electrodes.

16. The radiation detector of claim 9, wherein the envelope means is conductive and forms the outer cathode electrode.

17. The radiation detector of claim 9, further comprising a conductive collar around at least one of the insulative end supports for electrically connecting the set of anode wires.

18. A system for simultaneously detecting gamma radiation from a plurality of radioactive sources by means of a radiation-to-electron conversion gas and high voltage collection, comprising:

envelope means;

a plurality of open ended assay regions formed by the surface of the envelope means on the outside thereof, for receiving the plurality of radioactive sources;

a plurality of sets of spaced anode wires within the envelope means, one set of spaced anode wires positioned about each assay region;

cathode means within the envelope means spaced from the anode wires for defining a collection region between each set of anode wires and the cathode means;

a conversion gas contained in the envelope means within each collection region for converting the detected gamma radiations into free electrons;

an anode voltage bus for connecting the sets of anode wires in parallel;

a plurality of high impedance means, one connected in series between the anode voltage bus and each set of anode wires;

a plurality of anode output leads, one extending from each set of anode wires for conducting the collected free electrons;

a plurality of low impedance means, one connected between each anode output lead and the set of anode wires; and collection voltage supply means connected to the anode bus, and providing a single anode voltage for establishing a collection electric field from each set of anode wires to the cathode means for causing the free electrons produced within each collection region to be collected by the anode wires causing a gamma detection signal.

19. The system of claim 18, wherein the collection regions are in fluid communication forming a single conversion gas environment common to each collection region.

20. The system of claim 19, further comprising a valve means through the envelope means for permitting the passage of conversion gas into and out of the single conversion gas environment.

21. The system of claim 18, wherein the cathode means further comprises:

a plurality of outer cathodes within the envelope means, one outer cathode at least partially surrounding each set of anode wires and the collection region and assay region therefor;

a plurality of inner cathodes within the envelope means, one inner cathode positioned within each set of anode wires surrounding the assay region therefor.

22. The system of claim 21, wherein an output signal is obtained from the cathodes and the conductive means further comprises a plurality of cathode output leads.

23. The system of claim 21, wherein each cathode is a right cylinder with the anode wires extending symmetrically therewith.

24. The system of claim 18, wherein the plurality of assay regions are arranged in a planar array for simultaneously receiving a batch of radiation sources.

25. The system of claim 24, further comprising shielding means for preventing non-converted radiations escaping from any cell from entering an adjacent cell.

26. The system of claim 25, wherein the shielding means is formed by gamma absorbing material positioned between the adjacent cells.

27. The system of claim 25, wherein the shielding means is formed by the cathode means material.

28. The system of claim 24, wherein the outer cathode means is a plurality of separate cathode electrodes each of which is formed by the sides of a regular polygon prism having N sides, one cathode electrode surrounding each set of anode wires to form a detector cell.

29. The system of claim 28, wherein the N sides of each interior cell in the planar array are contiguous with one side of N adjacent cells to form a close packed honeycomb matrix of cells.

30. The system of claim 29, wherein the interior of each honeycomb cell is formed by N triangular prism volumes, each volume having one of the N sides of the cell as a base and having two leg faces, one extending from each of the two longitudinal edges of the base to the axis of the shell electrode.

31. The system of claim 30, wherein each triangular prism volume has a plurality of anode wires positioned therein extending parallel to the axis of the cell.

32. The system of claim 30, wherein each cell has N anode wires extending therethrough parallel to the axis of the cell, one anode wire positioned within each triangular prism volume in the geometrically identical position as the anode wires within the other triangular prism volumes.

33. The system of claim 30, wherein each anode wire is positioned on the plane extending through the middle of the triangular prism volume and passing through the axis of the cell orthogonal to the base of the triangular prism volume.

34. The system of claim 30, wherein each anode wire is positioned on a plane passing through the axis of the cell and through one of the longitudinal edges of the base of the triangular prism volume.

35. A system for simultaneously detecting gamma radiation from a series of radiation sources by means of a radiation-to-electron conversion gas, comprising:

a plurality of assay regions open at each end and arranged in a serial array for sequentially receiving the series of radiation sources;

a single rigid outer cathode means forming an outer envelope extending around all of the assay regions along the serial array;

a single thin inner cathode means within the outer cathode means extending around each of the assay regions along the serial array;

a plurality of sets of anode wires within the outer cathode means, the wires within each set are spaced apart and positioned about one of the plurality of assay regions and about the inner cathode means, each set of anode wires also spaced from the outer cathode means for defining an outer collection region therebetween and also spaced from the inner cathode means for defining an inner collection region therebetween;

internal support means extending from the outer cathode means for supporting the inner cathode means and the plurality of sets of anode wires;

a conversion gas contained in the outer cathode means within each collection region for converting the detected gamma radiations into free electrons;

conductive means connected to each set of anode wires and to the cathode means; and collection voltage supply means connected to the conductive means for establishing an outer collection electric field from each set of anode wires to the outer cathode means and an inner collection electric field from each set of anode wires to the inner cathode means for causing the free electrons produced within each collection region to accelerate towards the anode wires thereabout and generate multiple avalanche electrons which are collected by the anode wires causing a gamma detection signal.

36. The system of claim 35, wherein the sets of anode wires are equally spaced along the serial array, forming a series of identical and equally spaced collection regions.

37. The system of claim 36, further comprising:

conveyer means extending through the series of assay regions, and adapted to support the radiation sources; and motion means for moving the conveyer means causing each of the radiation sources to sequentially pass each of the collection regions.

* * * * *